United States Patent
Khan et al.

(10) Patent No.: US 7,159,061 B2
(45) Date of Patent: Jan. 2, 2007

(54) LINK LAYER DEVICE WITH CONFIGURABLE ADDRESS PIN ALLOCATION

(75) Inventors: Asif Q. Khan, Austin, TX (US); David B. Kramer, Austin, TX (US)

(73) Assignee: Agere Systems Inc., Allentown, PA (US)

( * ) Notice: Subject to any disclaimer, the term of this patent is extended or adjusted under 35 U.S.C. 154(b) by 260 days.

(21) Appl. No.: 10/744,567

(22) Filed: Dec. 23, 2003

(65) Prior Publication Data

US 2005/0138259 A1   Jun. 23, 2005

(51) Int. Cl.
- *H03M 7/20* (2006.01)
- *G06F 12/00* (2006.01)
- *G06F 13/14* (2006.01)
- *G06F 13/00* (2006.01)
- *G06F 11/00* (2006.01)

(52) U.S. Cl. .................. 710/305; 370/229; 370/394; 370/449; 370/466; 370/516; 370/395.42; 710/3; 710/33; 710/100; 709/232; 341/102

(58) Field of Classification Search ........ 710/305–307; 370/449
See application file for complete search history.

(56) References Cited

U.S. PATENT DOCUMENTS

| | | | | |
|---|---|---|---|---|
| 6,523,136 B1* | 2/2003 | Higashida | ..................... | 714/30 |
| 6,668,297 B1* | 12/2003 | Karr et al. | ................... | 710/305 |
| 6,671,758 B1* | 12/2003 | Cam et al. | .................. | 710/100 |
| 6,718,419 B1* | 4/2004 | Delvaux | ...................... | 710/305 |
| 6,751,233 B1* | 6/2004 | Hann | .......................... | 370/466 |
| 6,807,584 B1* | 10/2004 | Park | ............................... | 710/3 |
| 6,861,865 B1* | 3/2005 | Carlson | ........................ | 326/10 |
| 6,892,284 B1* | 5/2005 | Ling et al. | ................... | 711/153 |
| 6,909,727 B1* | 6/2005 | Shaffer et al. | .............. | 370/516 |
| 6,996,650 B1* | 2/2006 | Calvignac et al. | .......... | 710/305 |
| 2003/0169686 A1* | 9/2003 | Ni | .............................. | 370/229 |
| 2003/0184458 A1* | 10/2003 | Calvignac et al. | .......... | 341/102 |
| 2004/0004964 A1* | 1/2004 | Lakshmanamurthy et al. | .......................... | 370/394 |
| 2005/0005021 A1* | 1/2005 | Grant et al. | ................. | 709/232 |
| 2005/0138238 A1* | 6/2005 | Tierney et al. | ................ | 710/33 |
| 2005/0169298 A1* | 8/2005 | Khan et al. | ................. | 370/449 |
| 2006/0182118 A1* | 8/2006 | Lam et al. | ............. | 370/395.42 |

OTHER PUBLICATIONS

Cold Spring Engineering "POS-PHY 3 OVA"—2 pages—Oct. 2002.*

(Continued)

*Primary Examiner*—Paul R. Myers
*Assistant Examiner*—Brian Misiura

(57) ABSTRACT

Techniques are disclosed for flexible allocation of address pins of an interface bus to particular sub-buses of the interface bus. The interface bus is between at least one physical layer device and a link layer device in a communication system. Each of the sub-buses has an interface block of the link layer device associated therewith, the interface bus being configurable to carry a composite address signal having a plurality of portions each associated with one of the address pins of the interface bus. The interface blocks of the link layer device are controlled such that each of at least a subset of the interface blocks utilizes only particular ones of the address pins that are controllably allocated to the associated sub-bus in accordance with configuration information stored in the link layer device. The composite address signal is generated as a combination of address outputs of the interface blocks.

20 Claims, 2 Drawing Sheets

OTHER PUBLICATIONS

XILINX—"SPI-3 Physical Layer v4.1"—23 pages—Jan. 18, 2006.*

U.S. Appl. No. 10/689,090, filed Oct. 20, 2003, K.S. Grant et al., "Traffic Management Using In-Band Flow Control and Multiple-Rate Traffic Shaping".

Agere Systems, Product Brief, "Edge/Access and Multiservice Network Processors: APP550 and APP530," pp. 1-4, May 2003.

Implementation Agreement: OIF-SPI3-01.0, "System Packet Interface Level 3 (SPI-3): OC-48 System Interface for Physical and Link Layer Devices," Optical Internetworking Forum, pp. 1-42, 2001.

\* cited by examiner

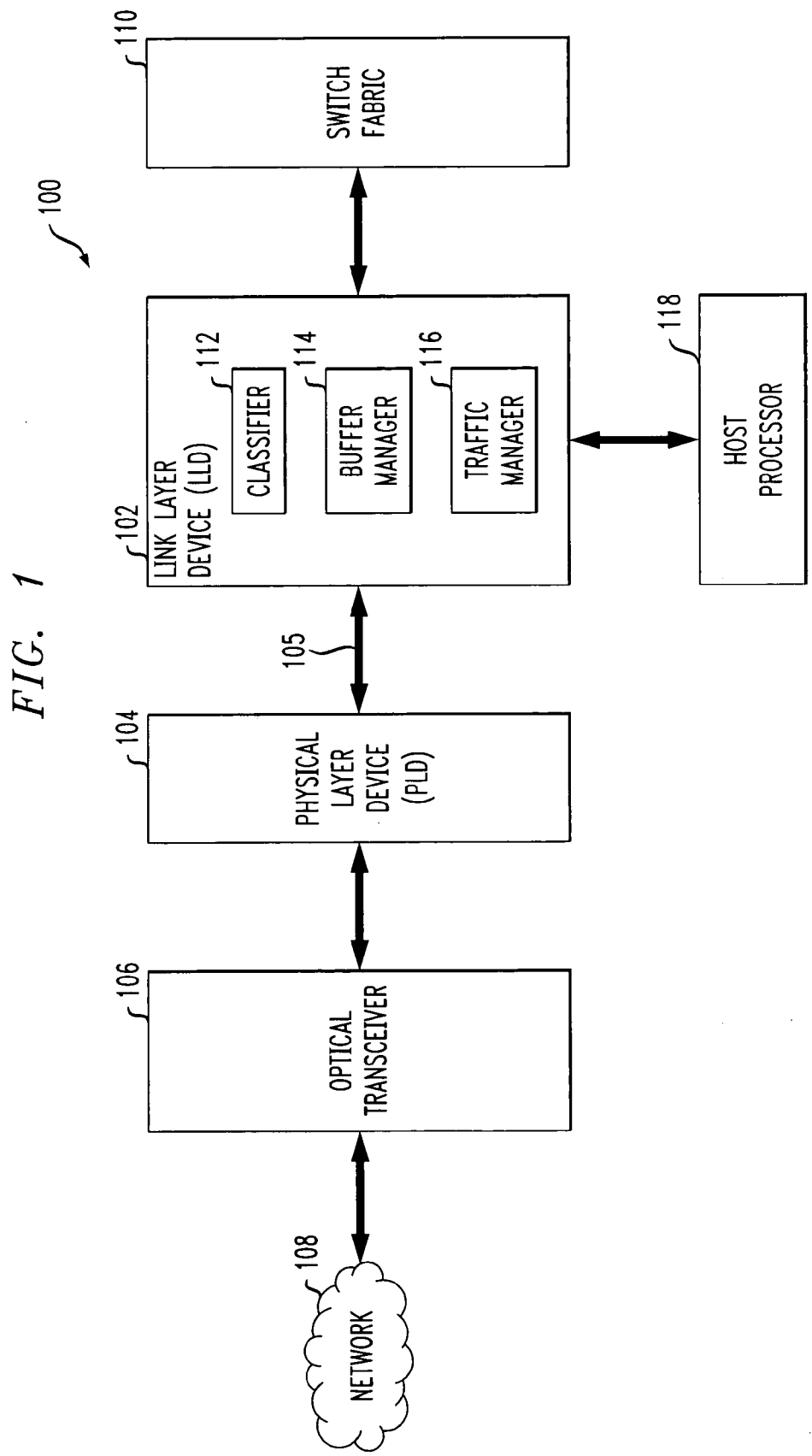

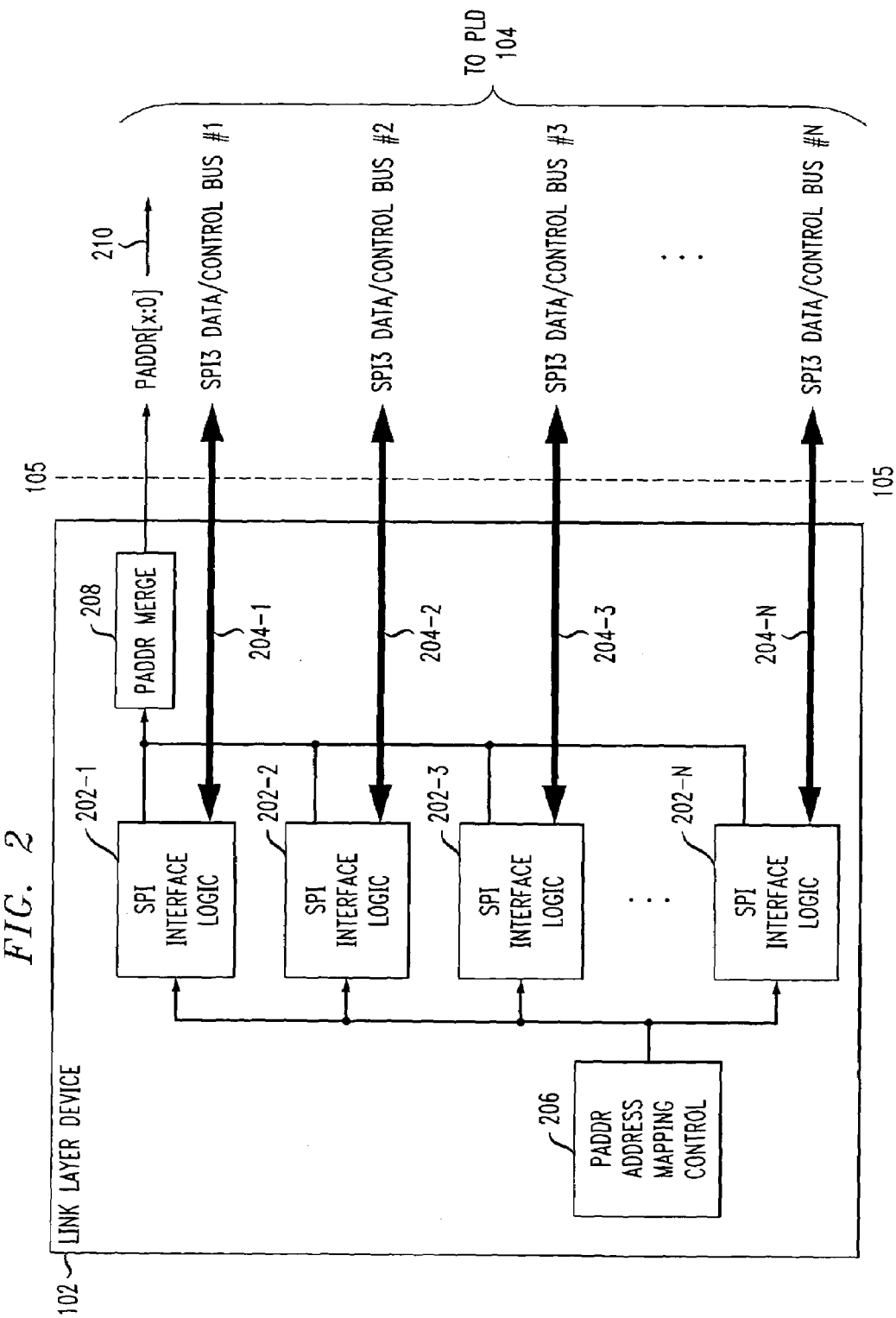

LINK LAYER DEVICE WITH CONFIGURABLE ADDRESS PIN ALLOCATION

FIELD OF THE INVENTION

The present invention relates generally to network-based communication systems, and more particularly to techniques for configuring an interface bus over which a physical layer device and a link layer device communicate with one another.

BACKGROUND OF THE INVENTION

A network processor is one example of what is more generally referred to herein as a link layer device, where the term "link layer" generally denotes a switching function layer. Such link layer devices can be used to implement packet-based protocols, such as Internet Protocol (IP) and Asynchronous Transfer Mode (ATM), and are also commonly known as Layer-3 (L3) devices in accordance with the well-known Open System Interconnect (OSI) model.

Communication between a physical layer device and a network processor or other type of link layer device may be implemented in accordance with an interface standard, such as the SPI-3 interface standard described in Implementation Agreement OIF-SPI3-01.0, "System Packet Interface Level 3 (SPI-3): OC-48 System Interface for Physical and Link Layer Devices," Optical Internetworking Forum, 2001, which is incorporated by reference herein.

A given physical layer device may comprise a multiple-port device which communicates over multiple channels with the link layer device. Such communication channels, also commonly known as MPHYs, may be viewed as examples of what are more generally referred to herein as physical layer device ports. A given set of MPHYs that are coupled to a link layer device may comprise multiple ports associated with a single physical layer device, multiple ports each associated with one of a plurality of different physical layer devices, or combinations of such arrangements. As is well known, a link layer device may be advantageously configured to detect backpressure (BP) for a particular MPHY via polling of the corresponding MPHY address on the physical layer device. The detected backpressure is used by the link layer device to provide flow control and other traffic management functions, thereby improving link utilization.

U.S. patent application Ser. No. 10/689,090 filed Oct. 20, 2003 and entitled "Traffic Management Using In-band Flow Control and Multiple-rate Traffic Shaping," discloses improved techniques for communicating information between a link layer device and a physical layer device, so as to facilitate backpressure detection and related traffic management functions, particularly in high channel count (HCC) packet-based applications.

A significant problem that can arise when utilizing a conventional SPI-3 interface for communication between a physical layer device and a link layer device is that insufficient configurability of the interface address pins is provided. For example, a typical implementation of the SPI-3 interface may separate a single 32-bit bus into multiple 16-bit buses, multiple 8-bit buses, or a combination of a 16-bit bus and one or more 8-bit buses.

In such an arrangement, the conventional approach is to provide a fixed allocation of a certain number of the address bits to each of the sub-buses, in accordance with the ratio of the size of the sub-bus to the single 32-bit bus. Thus, each 8-bit sub-bus will always be allocated one-fourth of the address bits associated with the 32-bit bus, while each 16-bit sub-bus will always be allocated one-half of the address bits associated with the 32-bit bus.

The disadvantage of this fixed allocation approach, as indicated previously, is that it fails to provide sufficient flexibility in allocation of the available address bits to the various sub-buses. The approach automatically assumes that a smaller sub-bus requires fewer address pins than a larger sub-bus, and that sub-buses of the same size require the same number of address pins, when such assumptions are not necessarily true. Thus, the fixed allocation approach does not provide optimal address pin allocations in many interface applications.

Accordingly, a need exists for a more flexible approach to allocating address bits to sub-buses of an interface bus between a physical layer device and a link layer device.

SUMMARY OF THE INVENTION

The present invention avoids the problems associated with the above-described conventional fixed allocation approach, by providing significantly enhanced flexibility in the allocation of address pins to sub-buses of an interface bus between one or more physical layer devices and a network processor or other link layer device in a communication system.

In accordance with one aspect of the invention, each of the sub-buses has an interface block of the link layer device associated therewith, and the interface bus is configurable to carry a composite address signal having a plurality of portions each associated with one of the address pins of the interface bus. The interface blocks of the link layer device are controlled such that each of at least a subset of the interface blocks utilizes only particular ones of the address pins that are controllably allocated to the associated sub-bus in accordance with configuration information stored in the link layer device. The composite address signal is generated as a combination of address outputs of the interface blocks.

The composite address signal may comprise a polling address signal of the form [x:0] and having x+1 portions each associated with a corresponding one of x+1 address pins of the interface bus.

The configuration information may specify a range of address pins allocated to each of the sub-buses of the interface bus. For example, the configuration information for a given one of the sub-buses may comprise a base address pin for the given sub-bus and a total number of address pins for the given sub-bus.

In an illustrative embodiment, the link layer device comprises, in addition to the interface blocks, an address mapping control element and a merge element. The address mapping control element operates in conjunction with the interface blocks to process the stored configuration information such that each of the interface blocks generates address outputs for only the address pins allocated to the associated sub-bus. The merge element merges address outputs from each of the interface blocks to generate the composite address signal.

Advantageously, the invention in the illustrative embodiment provides complete flexibility in the allocation of address pins to each sub-bus, such that each of the address pins can be allocated to any of the sub-buses, without regard to the particular sub-bus sizes. Thus, a first sub-bus having a larger size than a second sub-bus may be allocated a smaller number of address pins than the second sub-bus, or a first sub-bus having the same size as a second sub-bus may be allocated a different number of the address pins than the second sub-bus, such that an optimal address pin allocation can be provided in any interface application.

BRIEF DESCRIPTION OF THE DRAWINGS

FIG. 1 is a simplified block diagram of a network-based communication system in which the present invention is implemented.

FIG. 2 shows a more detailed view of the link layer device of the FIG. 1 system, illustrating the flexible allocation of interface bus address pins to interface sub-buses in accordance with the invention.

DETAILED DESCRIPTION OF THE INVENTION

The invention will be illustrated herein in conjunction with an exemplary network-based communication system which includes a link layer device, a physical layer device and other elements configured in a particular manner. It should be understood, however, that the invention is more generally applicable to any system in which it is desirable to provide flexibility in the allocation of address pins to sub-buses of an interface bus over which one or more physical layer devices and a link layer device communicate with one another.

A "link layer device" or LLD as the term is used herein refers generally to a network processor or other type of processor which performs processing operations associated with a link layer of a network-based system. Such a device may be implemented, by way of example and without limitation, utilizing a microprocessor, central processing unit (CPU), digital signal processor (DSP), application-specific integrated circuit (ASIC), or other type of data processing device, as well as portions or combinations of these and other devices.

A "physical layer device" or PLD as the term is used herein refers generally to a device which provides an interface between a link layer device and a physical transmission medium of a network-based system.

As indicated above, the conventional fixed allocation approach to allocating address pins of an interface bus between a physical layer device and a link layer device automatically assumes that a smaller sub-bus requires fewer address pins than a larger sub-bus, and that sub-buses of the same size require the same number of address pins. The conventional approach thus provides a fixed allocation of a certain number of the address bits to each of the sub-buses, in accordance with the ratio of the size of the sub-bus to the total bus. For example, in the case of a single 32-bit interface bus, each 8-bit sub-bus will always be allocated one-fourth of the address bits associated with the 32-bit bus, while each 16-bit sub-bus will always be allocated one-half of the address bits associated with the 32-bit bus. The problem is that the baseline assumptions of the conventional approach do not hold true in many interface applications, with the result that this approach provides a less-than-optimal allocation in such applications.

The present invention overcomes this problem by providing in an illustrative embodiment an improved technique for allocating address pins of an interface bus to sub-buses of that interface bus. In the illustrative embodiment, there is complete flexibility in the allocation of address pins to each sub-bus, such that each of the address pins can be allocated to any of the sub-buses, without regard to the particular sub-bus sizes. As a result, each potential sub-bus may be configured with its optimal arrangement of address pins. This improved technique thus does not make any assumptions regarding particular address pin allocations based on sub-bus size, and can accommodate a wide variety of different configurations.

FIG. 1 shows a network-based communication system 100 in which the invention is implemented. The system 100 includes a link layer device (LLD) 102 coupled to a physical layer device (PLD) 104 via an interface 105. The PLD 104 is coupled via an optical transceiver 106 to a network 108. The LLD 102 is coupled to a switch fabric 110. The LLD 102 is configured to communicate packets, cells or other protocol data units (PDUs) between the network 108 and the switch fabric 110 which controls switching of PDU data. The PLD 104 and optical transceiver 106 serve to interface the LLD to physical transmission media of the network 108, which are assumed in this case to comprise optical transmission media.

The LLD 102 may comprise, for example, an otherwise conventional network processor such as a PayloadPlus® network processor in the APP500 or APP750 product family, commercially available from Agere Systems Inc. of Allentown, Pa., U.S.A., suitably modified to incorporate flexible allocation of interface address pins to interface sub-buses in the manner described herein.

The PLD 104 may comprise one or more devices suitable for providing access termination and aggregation for multiple services, or any other physical layer device of a type known to those skilled in the art. As noted above, ports of a physical layer device are also referred to herein as MPHYs, although the invention can be implemented using other types of physical layer device ports. A given set of MPHYs that are coupled to the LLD 102 may comprise multiple ports associated with a single physical layer device, multiple ports each associated with one of a plurality of different physical layer devices, or combinations of such arrangements. The PLD 104 may therefore be implemented as a plurality of physical layer devices.

The interface 105 between the LLD 102 and the PLD 104 preferably comprises an interface bus configured in accordance with the SPI-3 interface standard. Other types of interface buses or interfaces could be used.

It is to be appreciated that the invention is not limited to use with any particular type of LLD or PLD. Numerous such devices suitable for use with the present invention are well known to those skilled in the art. The conventional aspects of these devices will therefore not be described in detail herein.

The LLD 102 as shown in FIG. 1 includes a classifier 112, a buffer manager 114 and a traffic manager 116. Such elements may be implemented as otherwise conventional network processor elements of a type known to those skilled in the art. Also, these elements may be configured to incorporate in-band flow control and multiple-rate traffic shaping techniques of the type described in the above-cited U.S. patent application Ser. No. 10/689,090.

The LLD 102 will also generally include other elements of a type commonly found in a network processor or other type of LLD. For example, LLD 102 will typically include an internal memory, as well as an interface to an external memory. Such memory elements may be utilized for implementing PDU buffer memory, queuing and dispatch buffer memory, etc. The LLD may further include one or more memory controllers, as well as appropriate interface circuitry for interfacing with the PLD 104, the switch fabric 110, and other external devices, such as a host processor 118 which may be configured to communicate with the LLD over a standard bus architecture, e.g., a peripheral component interconnect (PCI) bus. The LLD may also include a scheduler, queuing and dispatch logic, as well as other conventional elements not explicitly shown in the figure. The operation of these and other conventional elements, being well understood by those skilled in the art, is not described in detail herein.

The PLD 104 may comprise a plurality of queues, including ingress queues and egress queues, as well as appropriate interface hardware for interfacing with the LLD 102 and the transceiver 106. In other embodiments, the transceiver 106 may be implemented within the PLD itself, such that the PLD interfaces directly with the network 106.

It is also possible that the LLD and the PLD may be integrated together into a single device, such as an ASIC. The terms LLD and PLD as used herein should therefore be understood to include any set of one or more functional components which perform respective LLD and PLD operations in a single device.

It will be assumed in describing the illustrative embodiment that the term "egress" refers to the direction of data transfer from the network 108 to user equipment. The egress direction relative to the PLD 104 is thus the direction of data transfer from the PLD interface with the LLD 102 to the PLD interface with the transceiver 106. Similarly, it will be assumed that the term "ingress" refers to the direction of data transfer from user equipment to the network 108. The ingress direction relative to the PLD 104 is thus the direction of data transfer from the PLD interface with the transceiver 106 to the PLD interface with the LLD 102. It should be understood that these and other assumptions made herein are for clarity and simplicity of description only, and should not be construed as constituting limitations of the invention.

It should also be noted that the particular arrangement of system elements shown in FIG. 1 is by way of illustrative example only. More particularly, the invention can be implemented in any type of system having at least one LLD and at least one PLD, and is not limited to the particular processing applications described herein. The system 100 may include other elements in addition to or in place of those specifically shown, including one or more elements of a type commonly found in a conventional implementation of such a system.

The address pin to sub-bus allocation techniques of the present invention as described herein may be implemented at least in part in the form of software program code. For example, these techniques may be implemented at least in part utilizing LLD or PLD elements that are programmable via instructions or other software. Programmable elements in the LLD may be configured utilizing software or other configuration information downloaded into such elements from the host processor 118. For example, configuration information specifying a particular allocation of interface bus address bits to sub-buses may be downloaded into the LLD from the host processor in this manner.

With reference now to FIG. 2, a more detailed view of the LLD 102 is shown, illustrating the operation of an exemplary address pin to sub-bus allocation technique implemented within the LLD. The LLD as shown includes a plurality of interface logic blocks 202-1, 202-2, ... 202-N, each associated with a corresponding one of a plurality of sub-buses 204-1, 204-2, ... 204-N of an interface bus of interface 105, where N denotes the number of sub-buses of the interface bus in this embodiment. Thus, each of the sub-buses 204 has a corresponding one of the interface logic blocks 202 associated therewith.

The interface logic blocks 202 are illustratively shown as SPI logic interface blocks, which generally comprise interface logic blocks configured in accordance with an SPI standard such as the above-noted SPI-3 standard. It is to be appreciated that such interface logic blocks are merely an example of what are more generally referred to herein as "interface blocks," and this term is intended to include any type of interface logic or other circuitry, whether implemented in hardware, firmware, or software, as well as combinations of such elements, that may serve as an interface between a particular sub-bus and an LLD. The conventional aspects of such interface blocks are well known, and therefore not further described herein.

The sub-buses 204 are illustratively shown as SPI-3 data/control buses designated by numerals 1 through N, where the term "data/control" is intended to encompass data signals only, control signals only, or both data and control signals. In the illustrative embodiment, the sub-buses may each be viewed as sub-buses of an otherwise conventional 32-bit SPI-3 interface bus of the type previously described herein. Alternatively, one or more of the sub-buses may comprise a separate 32-bit SPI-3 interface bus. The term "sub-bus" as used herein is intended to include, without limitation, either of these different bus arrangements. The various sub-buses 204 may each be of the same size, or may be of a number of different sizes, as appropriate for a given application, and the invention is not restricted in this regard.

Also included in the LLD 102 is a PADDR address mapping control element 206, and a PADDR merge element 208. The notation "PADDR" in the figure generally refers to a polling address, although it is to be understood that the invention can be utilized in conjunction with allocation of address pins for other types of addresses, including other types of polling addresses as well as addresses which are not characterizable as polling addresses.

Generally, the LLD 102 provides flexible allocation of a plurality of address pins of the interface bus to particular sub-buses of the interface bus. More specifically, the interface logic blocks 202 of the LLD are controlled such that each of the interface logic blocks utilizes only particular ones of the address pins that are controllably allocated to the associated sub-bus in accordance with configuration information stored in the LLD. As noted previously, such configuration information may be provided to the LLD via the host processor 118. Alternatively, other techniques may be used to store the configuration information in the LLD. The configuration information may be stored in any programmable memory internal to or otherwise associated with the LLD. For example, such information may be stored within a memory incorporated in or otherwise associated with the PADDR address mapping control element 206.

The interface bus in the FIG. 2 embodiment is configurable to carry a composite address signal having a plurality of portions, with each of the portions being associated with one of the address pins of the interface bus. As shown in the figure, the composite address signal is generated on signal line 210 of the interface bus by the PADDR merge element 208, and comprises a polling address signal of the form PADDR[x:0] and having x+1 portions each associated with a corresponding one of x+1 address pins. As noted previously, other types of polling or non-polling address signals may be used in alternative embodiments.

The PADDR merge element 208 generates the composite address signal as a combination of address outputs of the interface logic blocks 202. The composite address signal is transmitted from the LLD to the PLD 104 via signal line 210 of the interface bus.

The PADDR address mapping control element 206 operates in conjunction with the interface logic blocks 202 to process the stored configuration information such that each of the interface logic blocks generates PADDR address outputs for only the PADDR address pins allocated to the associated sub-bus. That is, interface logic block 202-1 generates PADDR address outputs for only the PADDR address pins allocated to sub-bus 204-1, interface logic block 202-2 generates PADDR address outputs for only the PADDR address pins allocated to sub-bus 204-2, and so on. Of course, one or more of the sub-buses 204 need not have any of the address pins allocated thereto. Thus, each of the interface logic blocks 202 generates address outputs only for those address pins allocated to its associated sub-bus 204.

As noted above, the PADDR merge element 208 generates the composite address signal as a combination of the address outputs of the interface logic blocks 202. More specifically, the merge element in the illustrative embodiment merges the address outputs from each of the interface logic blocks to generate the composite address signal PADDR[x:0] that is transmitted on signal line 210 of the interface bus. This merging operation may be implemented as a logic OR of the address output signal lines, or using other techniques of a type known to those skilled in the art, such as multiplexing.

The configuration information, as stored in the LLD 102 or as processed by the PADDR address mapping control element 206 and interface logic blocks 202 may comprise, by way of example, a range of address pins allocated to each of the sub-buses of the interface bus. One or more of such ranges may be specified, for a given one of the sub-buses 204, as a base address pin for the given sub-bus and a total number of address pins for the given sub-bus. Thus, if sub-bus 204-1 is to be allocated three out of a total of eight available address bus pins, in an embodiment in which x=7, the interface logic block 202-1 may be directed under the control of the PADDR address mapping control element 206 to generate address outputs only for a total of three address pins starting with a base address pin 0. As a result, the interface logic block 202-1 generates address outputs for address pins 0, 1 and 2 only. Numerous other arrangements may be used for controlling the interface logic blocks such that they utilize only the particular ones of the address pins that are allocated to their respective sub-buses.

In the FIG. 2 embodiment, each of the address pins associated with the composite address signal PADDR[x:0] is controllably allocatable to any one of the sub-buses 204 of the interface bus. The address pins are thus controllably allocatable to the sub-buses without regard to the sizes of the sub-buses. Therefore, it is possible that a first one of the sub-buses having a larger size than a second one of the sub-buses is allocated a smaller number of the address pins than the second sub-bus. Similarly, it is possible that a first one of the sub-buses having the same size as a second one of the sub-buses is allocatable a different number of the address pins than the second sub-bus. Further, as indicated previously, it is possible that at least one of the sub-buses may not be allocated any of the address pins.

The illustrative embodiment therefore advantageously avoids the problems associated with conventional fixed allocation, by providing complete flexibility in the allocation of address pins to each sub-bus, such that each of the address pins can be allocated to any of the sub-buses, without regard to the particular sub-bus sizes.

Another advantage of the illustrative embodiment described above is that the flexible allocation of address pins to interface sub-buses may be provided using an otherwise standard interface between the LLD and the PLD, such as an SPI-3 interface.

An LLD or PLD in accordance with the invention may be implemented as an integrated circuit device suitable for installation on a line card or port card of a router or switch. Numerous other configurations are possible.

Again, it should be emphasized that the embodiments of the invention as described herein are intended to be illustrative only. For example, the SPI-3 interface used in the illustrative embodiment of FIG. 2 may be replaced with another type of standard interface, or a non-standard interface, as well as combinations of standard and non-standard interfaces. Also, the particular arrangement of mapping address control, interface logic block and merge elements shown in FIG. 2 is presented by way of example, and numerous other arrangements of elements may be used to implement flexible allocation of address pins to interface sub-buses in alternative embodiments. Furthermore, the address signal and configuration information formats may be varied in alternative embodiments. These and numerous other alternative embodiments within the scope of the following claims will be readily apparent to those skilled in the art.

What is claimed is:

1. A method for providing flexible allocation of a plurality of address pins of an interface bus between at least one physical layer device and a link layer device in a communication system, to particular sub-buses of the interface bus, each of the sub-buses having an interface block of the link layer device associated therewith, the interface bus being configurable to carry a composite address signal having a plurality of portions each associated with one of the address pins of the interface bus, the method comprising the steps of:

controlling the interface blocks of the link layer device such that each of at least a subset of the interface blocks utilizes only particular ones of the address pins that are controllably allocated to the associated sub-bus in accordance with configuration information stored in the link layer device; and generating the composite address signal as a combination of address outputs of the interface blocks.

2. The method of claim 1 wherein each of the address pins is controllably allocatable to any one of the sub-buses of the interface bus.

3. The method of claim 1 wherein the composite address signal comprises a polling address signal of the form [x:0] and having x+1 portions each associated with a corresponding one of x+1 address pins.

4. The method of claim 1 wherein the interface bus between the physical layer device and the link layer device is configured in accordance with an SPI-3 interface standard.

5. The method of claim 1 wherein the configuration information specifies a range of address pins allocated to each of the sub-buses of the interface bus.

6. The method of claim 1 wherein the configuration information for a given one of the sub-buses comprises a base address pin for the given sub-bus and a total number of address pins for the given sub-bus.

7. The method of claim 1 wherein the address pins are controllably allocatable to the sub-buses without regard to sizes of the sub-buses.

8. The method of claim 7 wherein the address pins are controllably allocatable to the sub-buses such that a first sub-bus having a larger size than a second sub-bus is allocatable a smaller number of the address pins than the second sub-bus.

9. The method of claim 7 wherein the address pins are controllably allocatable to the sub-buses such that a first sub-bus having the same size as a second sub-bus is allocatable a different number of the address pins than the second sub-bus.

10. The method of claim 1 wherein the controlling step is implemented at least in part in an address mapping control element of the link layer device.

11. The method of claim 10 wherein the address mapping control element operates in conjunction with the interface blocks to process the stored configuration information such that each of the interface blocks generates address outputs for only the address pins allocated to the associated sub-bus.

12. The method of claim 1 wherein each of the interface blocks generates address outputs only for those address pins allocated to its associated sub-bus.

13. The method of claim 1 wherein the generating step comprises merging address outputs from each of the interface blocks to generate the composite address signal.

14. The method of claim 1 wherein the link layer device comprises a network processor.

15. The method of claim 1 wherein the composite address signal is transmitted from the link layer device to the physical layer device.

16. The method of claim 1 wherein at least one of the sub-buses is not allocated any of the address pins.

17. The method of claim 1 wherein the configuration information is downloadable to the link layer device from an external processor.

18. The method of claim 1 wherein one or more of the interface blocks each comprises an interface logic block coupled to its associated sub-bus.

19. An apparatus for providing flexible allocation of a plurality of address pins of an interface bus to sub-buses of that interface bus, the interface bus being configurable to carry a composite address signal having a plurality of portions each associated with one of the address pins of the interface bus, the apparatus comprising:

a link layer device connectable to at least one physical layer device via the interface bus;

the link layer device comprising a plurality of interface blocks, each of the sub-buses having one of the interface blocks associated therewith;

the link layer device being operative to control the interface blocks of the link layer device such that each of at least a subset of the interface blocks utilizes only particular ones of the address pins that are controllably allocated to the associated sub-bus in accordance with configuration information stored in the link layer device; and the link layer device being further operative to generate the composite address signal as a combination of address outputs of the interface blocks.

20. An article of manufacture comprising a machine-readable storage medium having one or more software programs stored therein, for use in providing flexible allocation of a plurality of address pins of an interface bus between at least one physical layer device and a link layer device in a communication system, to particular sub-buses of the interface bus, each of the sub-buses having an interface block of the link layer device associated therewith, the interface bus being configurable to carry a composite address signal having a plurality of portions each associated with one of the address pins of the interface bus, the link layer device being operative under control of the one or more software programs to perform the steps of:

controlling the interface blocks of the link layer device such that each of at least a subset of the interface blocks utilizes only particular ones of the address pins that are controllably allocated to the associated sub-bus in accordance with configuration information stored in the link layer device; and generating the composite address signal as a combination of address outputs of the interface blocks.

* * * * *